United States Patent [19]

Ruskin

[11] Patent Number: 5,052,625
[45] Date of Patent: Oct. 1, 1991

[54] PRESSURE COMPENSATING DRIP IRRIGATION SYSTEM

[76] Inventor: Rodney R. Ruskin, 50 Pemberton Pl., San Francisco, Calif. 94114

[21] Appl. No.: 487,618

[22] Filed: Mar. 2, 1990

[51] Int. Cl.⁵ ............................................. B05B 15/00
[52] U.S. Cl. .................................................. 239/542
[58] Field of Search ......................................... 239/542

[56] References Cited

U.S. PATENT DOCUMENTS

| | | |
|---|---|---|
| 3,873,030 | 3/1975 | Barragan . |
| 3,979,070 | 9/1976 | Lemelshtrich . |
| 3,998,391 | 12/1976 | Lemelshtrich ................ 239/542 |
| 4,195,784 | 4/1980 | Gilead . |
| 4,209,133 | 6/1980 | Mehoudar ..................... 239/542 |
| 4,210,287 | 7/1980 | Mehoudar . |
| 4,307,841 | 12/1981 | Mehoudar et al. ............. 239/542 |
| 4,366,926 | 1/1983 | Mehoudar ..................... 239/542 |
| 4,473,525 | 9/1984 | Drori . |
| 4,573,640 | 3/1986 | Mehoudar ..................... 239/542 |

*Primary Examiner*—Andres Kashnikow
*Assistant Examiner*—Lesley Morris
*Attorney, Agent, or Firm*—Christie, Parker & Hale

[57] ABSTRACT

A drip irrigation system provides drip action of water flowing under pressure in an irrigation supply conduit. A drip emitter bonded to the exterior of the supply conduit receives water from the conduit passes the water through a pressure compensating labyrinthine channel formed internally in the emitter, and discharges the water from the channel at a greatly reduced pressure drop so the water drips at a slow drip rate. The emitter includes an elastomeric pressure compensating diaphragm contained within the emitter between the exterior of the supply conduit outer wall and the teeth of the labryinth. When water pressure is applied, the diaphragm is held in pressure contact with the ends of the teeth to form a pressure compensating side of the labyrinthine channel, for stabilizing the output drip rate of the emitter by accommodating flow pressure variations in the supply conduit. In one embodiment, the emitter is bonded to the exterior wall of the irrigation supply conduit by magnetic induction heating techniques. A region of fusible bonding material is disposed around the outside boundary of the labyrinthine channel, and the diaphragm is placed inside the emitter over the teeth of the labyrinth and the emitter is then placed over the supply conduit so the fusible bonding material overlies the exterior wall of the conduit. The bonding material is then fused by magnetic induction heating techniques to weld the inside of the emitter around the periphery of the channel to the exterior wall of the conduit.

21 Claims, 2 Drawing Sheets

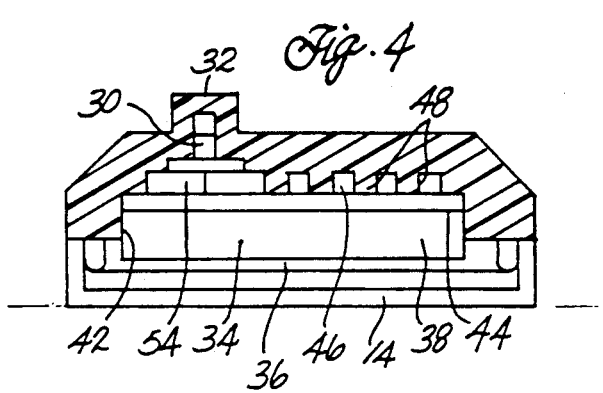
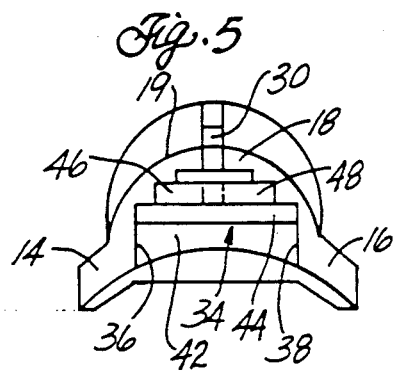
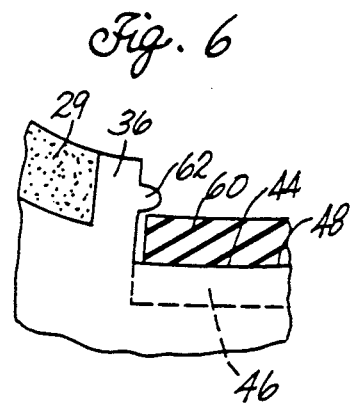
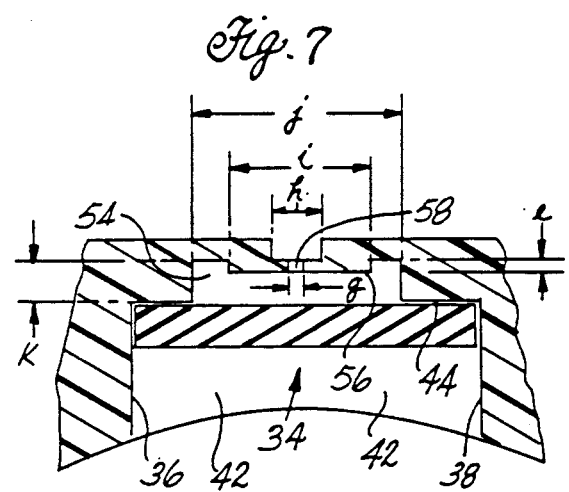
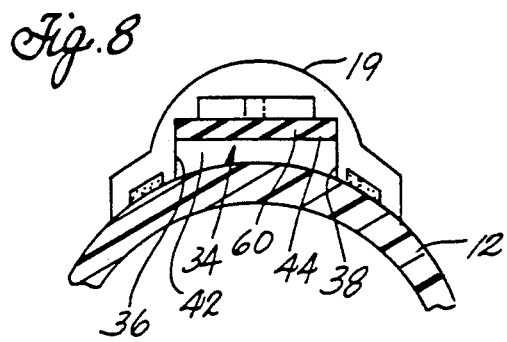

PRESSURE COMPENSATING DRIP IRRIGATION SYSTEM

FIELD OF THE INVENTION

This invention relates generally to drip irrigation, and more particularly, to a pressure compensating drip irrigation system.

BACKGROUND OF THE INVENTION

Drip irrigation systems usually include a continuous irrigation water supply line with separate emitter units installed on the line, or in the line, usually at regular intervals. Irrigation water flows through the supply line under pressure, and a small amount of water continuously drips out at the intervals where the drip emitter units are installed. Drip irrigation has proved highly successful in producing greater growth of vegetation for the same amount of water when compared with conventional irrigation techniques.

There is a continuing need for a low cost dripper system having reliable performance in terms of uniform flow rates and resistance to clogging at normal operating pressures of say between 10 to 15 psi. (The dripper of this invention operates in a range from 10 to 50 psi.) A single hole in the water supply line may be the cheapest of drip systems, but such an approach is not satisfactory in most cases. The hole in the pipe wall must be of minute size to produce the desired drip rate. However, the required hole size is so small that blockage is almost inevitable at a number of places along the line, even with filtering. Moreover, a minute hole limits the operating pressure in the supply line to a maximum of about 5 psi. At a higher, more desirable line pressure of at least 15 psi, the water jets or sprays through the holes in the pipe wall. By reliably running a drip irrigation system at the higher operating pressure, longer dripper lines can be used; more output, in terms of gallons of water per hour, is produced; and the system can work on undulating ground (up and down slopes) as well as on flat ground.

A large number of more sophisticated drip irrigation systems have been developed for the purpose of overcoming the problems inherent in a single hole in the wall of the irrigation line. A common and successful approach involves use of separate emitter units installed in or on the supply line. The emitter unit taps off a portion of the water flowing in the supply line and passes the water through a labyrinth or other circuitous path that produces a large pressure drop in the water and discharges it at a uniform drip rate. Generally, such pressure-reducing labyrinthine emitter units are successful because they can use a large enough hole in the supply pipe and a wide enough passage through the labyrinth to avoid clogging in most cases, and they can be used at higher line pressures.

There is a need for a drip irrigation emitter that is simple in structure so that manufacturing costs are low, while also having the capability of being assembled with reasonably low capital and labor costs. It is also desirable that the emitter be capable of use within thin-wall pipe as well as more permanent heavy-wall pipe. Orchards and vineyards, for example, commonly use permanent drip irrigation systems, whereas cheaper thin-wall pipe can be used for temporary drip irrigation sites. A low cost drip irrigation system can be particularly important because of its use in temporary irrigation sites where irrigation systems of the lowest possible cost are needed. For example, inexpensive temporary irrigation systems can be used because of harvesting techniques where crops such as cane sugar are harvested by bulldozing the entire field, including the above-surface portion of the irrigation system. Temporary irrigation systems also are used on temporary growing sites for row crops such as lettuce, tomatoes, strawberries, cotton, and flowers, for example.

The drip irrigation systems presently known are not entirely satisfactory in terms of low cost, reliability and uniform drip rates, non-interference with free flow in the dripper line, resistance to clogging, and capability of use with thin-wall pipe as well as more permanent heavy-wall pipes. One presently known drip irrigation unit is an insert-type system in which a portion of the drip irrigation unit is inserted into one end of an irrigation supply line. The end of another irrigation line is passed over the remainder of the drip irrigation unit. Flow is between the exterior labyrinth surface of the inserted unit and the interior of the irrigation pipe wall. The fit is a cold friction fit which can introduce serious quality control problems, since the annular spaces can be subject to considerable variation because of lack of uniformity commonly present in the pipe inner diameter. This unit must be used with heavy-wall pipe because internal flow pressures can cause a thin-wall pipe to expand outwardly just enough to allow the water passing through the labyrinth to skip over teeth in the labyrinth and short circuit a portion of the labyrinth which, in turn, can produce an undesired change in drip rate at the end of the labyrinth. The pipe is cut to insert the dripper. This creates a risk of separation in the field.

Another insert-type drip irrigation unit is a complex pressure-compensated unit in which the labyrinth for providing the pressure drop is bonded to the interior wall of the irrigation pipe by bonding legs. Pressure compensation is provided by a rubber diaphragm which is pressed into and blocks part of the labyrinth as pressure is increased within the pipe. This arrangement requires expensive equipment to insert the drippers during extrusion of the pipe.

Another insert-type drip irrigation unit is assembled during extrusion of the plastic irrigation pipe. The unit is made by heating the plastic pipe (from the heat of extrusion). The dripper emitter unit is then inserted into the desired position within the pipe. Heat from the molten pipe bonds the interior of the pipe to the exterior of the inserted dripper unit. Such extrusion equipment is expensive, in part, because it requires precise temperature control during assembly. That is, good adhesion must be provided between the pipe and the emitter to ensure that the dripper will function properly hydraulically. If the temperature is too high, the softened pipe wall can flow into portions of the passageway through the labyrinth. If the temperature is too low, the adhesion is poor. Inasmuch as this arrangement uses the inner wall of the supply pipe to form the outer wall of the flow passage through the dripper, the pressure inside the dripper can open the bond between the inside wall of the pipe and the outside surface of the dripper.

A limitation of such insert-type units is hydraulic interference with flow through the interior of the irrigation pipe. As a result, the possible free flow through the irrigation pipe is reduced which, in use, reduces the useful length of the dripper line. The pipe is either cut to allow insertion of the dripper after extrusion of the pipe, which creates the risk of separation in the field, or else expensive equipment is required to allow insertion of the dripper into the pipe during the extrusion process. Insertion of drippers after the extrusion process also can cause stress cracks in the polyethylene pipe.

Another drip irrigation system is a so-called clip-on bayonet system, in which a bayonet or barb on the emitter is passed through the wall of an irrigation pipe and so the emitter unit itself is mounted on the exterior of the supply pipe. Water is drawn through the bayonet into a labyrinth formed in the interior of the exterior dripper unit. The dripper unit is usually a high-profile unit which can cause hooking and entangling with weeds, grass, etc. when pulled around a field when laying the irrigation unit. All known bayonet systems are complex multi-component systems which are relatively expensive to manufacture and assemble because of material and manual assembly costs. Bayonet systems typically require a heavy-wall pipe to properly hold the bayonet in place, and the inserted bayonet interferes with the free flow through the irrigation line.

The present invention provides an irrigation system with a single-component drip emitter unit that can be constructed at a much lower cost, while overcoming disadvantages of the prior drip irrigation units described above.

In recent years there have been a number of drip irrigation systems in which the emitter includes a resiliently flexible membrane formed of a natural or synthetic elastomeric material. The flexible membrane is displaceable toward or away from the flow-restricting flow path in the dripper in response to flow pressure variations in the conduit so as to stabilize the drip rate of the emitter with respect to variations in line pressure. There are several pressure compensating drippers which are separate units and which are attached to the supply conduit by a barb, for example, the pressure compensation dripper shown in Mehoudar (U.S. Pat. No. 4,209,133). This is a complicated, four-part emitter which is both expensive to manufacture and expensive to install in the field. At the present time, it costs about U.S. $0.05 per emitter for labor to install such an emitter in the field. Furthermore, since farmers frequently wish to pull the dripper line out of the field, an emitter such as the '133 emitter will catch on stalks and pull off the line. To solve these problems, a dripper such as that shown in Mehoudar U.S. Pat. No. 4,210,287 was developed in which the emitter is inside the supply conduit. However, this is still an expensive solution to the problem because precautions must be taken to prevent the rubber diaphragm from being drawn out of the emitter by the vacuum which can result from water draining out of the system. This entails assembling the dripper out of several parts before inserting it into the supply tube. The machinery to insert parts into the center of the supply tube during extrusion is very expensive. Finally, the thicker wall section of the tube itself demonstrates the difficulty in producing consistent adhesion by means of the heat of the extruded material alone. This thicker wall section also increases material costs.

The present invention provides a pressure compensating emitter for a drip irrigation system which solves the problems described above. The dripper itself is a simple molded article made by using a two-material molding technique which is inexpensive in both material and labor costs. The result is a low cost dripper which is not only pressure compensating, but which also can be pulled out of the field and used again without the risk of losing emitters on the irrigation supply line. The emitter of the present invention also does not have barbs or other parts disturbing the water flow through the tube which results in less pressure loss and a saving of power costs. Other advantages also are provided.

SUMMARY OF THE INVENTION

Briefly, one embodiment of the invention comprises a drip irrigation system which includes a supply conduit and a drip emitter having an upright wall secured to the exterior wall of the supply conduit and forming a sealed interior chamber between the supply conduit and the inside of the upright wall. A labyrinth formed in the inside surface of the emitter spaced from the exterior wall of the conduit is formed by spaced apart labyrinth teeth having their ends spaced from the inside surface of the emitter. An elastomeric pressure compensating diaphragm is disposed within the sealed chamber for pressure contact with the ends of the labyrinth teeth so that water admitted under pressure from the supply conduit to the sealed chamber seals the diaphragm to the teeth of the labyrinth. This forms a sealed labyrinthine channel between the diaphragm and the inside surface of the emitter. Water admitted to the sealed chamber flows through the sealed labyrinthine channel and is emitted from the channel at a slow drip rate controlled by the pressure compensating action of the diaphragm that accommodates changes in line pressure within the supply conduit.

The present invention provides significant improvements in drip irrigation. By placing the elastomeric diaphragm between the outside wall of the supply tube and the top of the labyrinth teeth, the diaphragm seals to the tops of the labyrinth teeth in a continuous, fluid-tight seal that can accommodate slight differences in the thickness of the teeth. The diaphragm thus provides pressure compensation and simultaneously acts as a hydraulic seal of the dripper mounted to the outside wall of the supply tube. This invention also allows the dripper to be reduced in length substantially, thereby saving material and molding costs. The elastomeric diaphragm is free to float between the top of the labyrinth teeth and the outside of the supply tube when there is no water pressure in the system. When the water pressure is applied, the diaphragm is brought into contact with the top of the teeth, and any impurities which may have been caught in the dripper during the previous irrigation cycle are expelled.

As a further advantage, the dripper can be formed as a bond-on dripper in which the peripheral boundary of the emitter unit can be easily bonded to the exterior wall of the supply conduit using a ferromagnetic bonding material at the boundary responsive to magnetic induction heating techniques. These techniques combined with the arrangement of the elastomeric diaphragm inside the bondon emitter greatly simplify assembly and reduce costs.

Because the diaphragm is enclosed by the dripper body and the outside wall of the supply tube, it cannot be disturbed by the flow of water through the tube as happens with a dripper inserted inside the supply tube, such as the Mehoudar '287 device described above. Hence, the outside wall of the tube acts as the diaphragm retaining wall at no cost compared with prior art systems which require more expensive and complicated systems for retaining the pressure compensating diaphragm within the emitter.

These and other aspects of the invention will be more fully understood by referring to the following detailed description and the accompanying drawings.

BRIEF DESCRIPTION OF THE DRAWINGS

FIG. 4 is a longitudinal cross-sectional illustration of a pressure compensating emitter.

FIG. 5 is a cross-sectional view taken on line 5—5 of FIG. 4.

FIG. 6 is a fragmentary cross-sectional view illustrating a means for retaining a pressure compensating diaphragm.

FIG. 7 is a fragmentary cross-sectional view illustrating an inlet region of the pressure compensating emitter.

FIG. 8 is a fragmentary cross-sectional view taken on line 8—8 of FIG. 1 and illustrating the pressure compensating emitter bonded to the exterior wall of the irrigation supply conduit.

DETAILED DESCRIPTION

Figure 1:
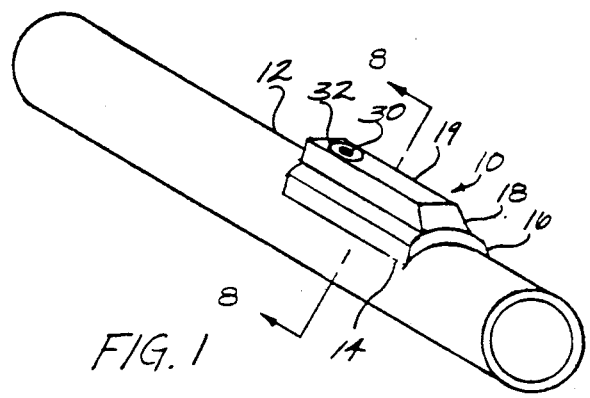
FIG. 1 is a perspective view illustrating a pressure compensating drip irrigation emitter bonded to the exterior of an irrigation supply conduit.

FIG. 1 is a perspective view showing a drip irrigation emitter unit 10 secured to the exterior wall of a conventional tubular irrigation supply conduit 12 of circular cross-section. The supply pipe is conventional in the sense that it has a smooth interior and exterior surface, i.e., no surface irregularities need to be formed in the inside or outside wall of the supply pipe to conform to use with the emitter unit 10. In one embodiment, the supply conduit 12 is made from a somewhat flexible, thin-walled plastic material, e.g., a thermoplastic material such as polyethylene. The drip unit also can be made from a thermoplastic material such as polyethylene. In one embodiment, the emitter unit is made from the same material as the supply conduit, in part to provide good adhesion between the emitter and the conduit. The emitter unit can be made from a flexible plastic material and adhered to a flexible, thin-walled plastic pipe by bonding techniques described below.

Only one emitter unit is shown in the drawing for simplicity. In practice, a drip irrigation system can be formed by securing a number of the drip emitter units to a continuous irrigation supply pipeline at intervals along the length of the pipeline. Each emitter unit taps off a portion of the water flowing through the pipeline and discharges the water from the emitter at a slow drip rate.

Figure 2:
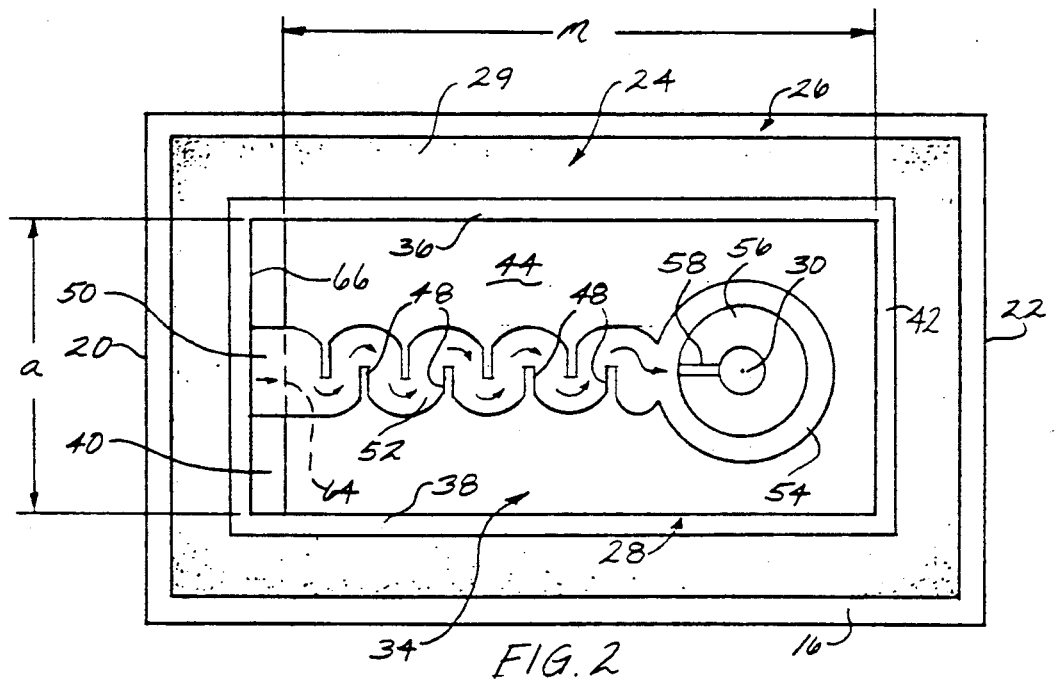
FIG. 2 is an elevation view showing the inside region of the emitter.

The emitter is preferably a one-piece unit, injection molded in a complex shape which is elongated and generally rectangular in its outer profile when the emitter is viewed from above or from inside as in FIG. 2. When viewed in cross-section as in FIGS. 5 or 8, the emitter has a generally inverted U-shaped lower portion forming narrow, concavely curved, marginal flanges 14 and 16 extending longitudinally and parallel to one another along opposite sides of the emitter. A long, central region 18 of the emitter projects upwardly between the side flanges 14 and 16. The long, central region forms an elongated, rectangular, raised section which is inverted U-shaped in cross-section and of uniform width along the main axis of the emitter from one end to the other. The long, central region of the emitter has a rounded, inverted U-shaped, upper surface 19 spaced from the bottom of the emitter. The flanges 14 and 16 form the bottom of the emitter along its opposite sides. The inverted U-shaped, front and rear bottom peripheral surfaces 20 and 22 of the emitter extend parallel to one another between the side flanges along the front and rear ends of the emitter.

A narrow, rectangular recess 24 extends around the periphery of the emitter inside surface. Parallel opposite sides of the rectangular recess are formed in the curved inside faces of the side flanges 14 and 16. Parallel opposite ends of the rectangular recess are formed at right angles to the long sides of the rectangle and are inverted U-shaped in cross-section in the inside faces of the end surfaces 20 and 22 of the emitter. Thus, when the emitter is viewed from the inside as in FIG. 2, the narrow, rectangular recess 24 is formed between a rectangular outer wall 26 on the outside wall of the emitter and a rectangular inside wall 28 spaced uniformly inside the outer wall. The rectangular remote ends of the outer and inner walls of the recess are shaped and formed so as to essentially match the curved outer surface contour of the supply conduit 12, so that the bottom peripheral portion of the emitter can lie essentially in flat contact with the supply conduit outer wall when the emitter is bonded to the outer wall as described below. The rectangular outer recess provides a means for containing a fusible bonding material 29, described below, for extending continuously around the rectangular bottom periphery of the emitter.

The emitter body also includes one or more fluid discharge ports 30 extending through an exterior discharge region 32 near one end of the emitter. The discharge region 32 is molded to the main body 18 of the emitter and projects away from the main central section of the emitter to provide a means for discharging water from the interior of the emitter to the exterior of the emitter at a slow drip rate.

Referring to FIGS. 4, 5 and 8, a longitudinally extending, rectangular, downwardly opening cavity 34 extends axially along the inside of the emitter. The cavity is rectangular when viewed in plan view as in FIG. 2. The cavity has long, parallel, upright side walls 36 and 38 extending parallel to the sides of the emitter, and short, parallel, upright end walls 40 and 42 at right angles to the side walls of the cavity. The long side walls of the cavity are spaced inwardly and parallel to the longitudinal walls of the inside wall 28 of the rectangular recess 24, and the short end walls of the cavity are spaced inwardly from and parallel to the lateral end walls forming the inside end wall portion of the rectangular recess. The cavity has a flat bottom wall 44 which faces downwardly toward the open bottom side of the emitter. The plane of the flat bottom wall is at right angles to the upright side walls of the rectangular cavity.

A labyrinthine channel 46 is formed as a recess in the flat, bottom surface 44 of the emitter interior. The labyrinthine channel is formed by a plurality of longitudinally spaced apart, elongated ribs or teeth 48 projecting into the channel from both sides of the channel. The teeth are interleaved along the length of the channel, are generally parallel to one another, generally perpendicular to the axis of the channel, are of uniform size and shape, and are equidistantly spaced apart along the channel. The alternating teeth therefore form a labyrinthine channel that continuously reverses direction from an inlet end 50 (which opens through the end wall 40) to the discharge end of the channel and its discharge port 30. The arrows in FIG. 2 best illustrate the continuous reversal of direction of water passing through the labyrinth formed by the channel. As illustrated best in FIGS. 4, 5, 7 and 8, the tops of the teeth 48 (which are the remote end of the teeth spaced below the bottom surface 52 of the channel) are at the same flat elevation as the flat bottom surface 44 of the chamber 34.

A narrow, circular well 54 is formed at the discharge end of the channel so that water passing through the channel can pass into the circular well. The well is continuous with the level of the channel bottom. A circular, projecting region 56 in the center of the well has a flat bottom formed spaced below the flat bottom surface 44 of the interior chamber. A narrow slot 58 passes axially through the projecting center of the well for providing a narrow channel between the end of the labyrinthine channel and the discharge port 30 which passes through the center of the circular, projecting region 56 inside the well.

Figure 3:
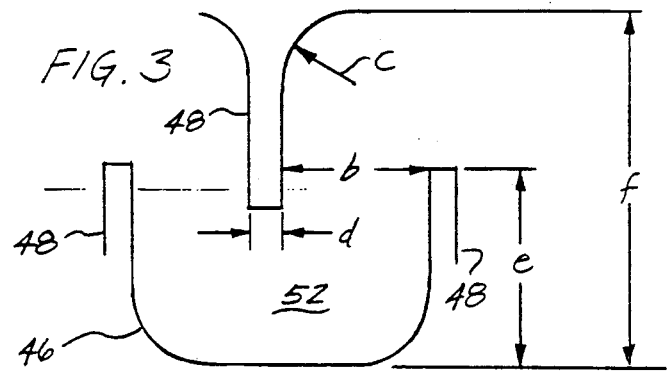
FIG. 3 a schematic illustration of the dimensions of a labyrinthine drip irrigation channel contained in the emitter.

Referring to FIGS. 2, 3 and 7, an example of the dimensions of one embodiment of the invention is as follows, the following dimensions being in millimeters: a=8.0, b=1.0, c=0.5, d=0.2, e=1.3, f=2.4, g=0.38, h=1.3, i=3.5, j=5.0, k=1.0 and l=0.3.

Referring to FIGS. 4 through 8, a thin, rectangular, elastomeric pressure compensating diaphragm 60 is disposed within the hollow interior region of the emitter for contacting the bottom edges of the labyrinth teeth. The pressure compensating diaphragm is preferably made from a rubber material such as EPDM rubber of a 40 Shore A hardness. The diaphragm is configured and arranged to seal to the bottoms of the labyrinth teeth to provide a hydraulic seal for one side of the labyrinthine channel spaced remote from the bottom 52 of the channel. The length of the diaphragm extends from the end wall 40 to the opposite end wall 42 as shown in FIG. 2, and the width of the diaphragm spans the distance between the side walls 36 and 38. In the example described above, the dimensions of the diaphragm are 7.9 mm in width, 15.9 mm in length and 1.0 mm thick. As shown best in FIG. 6, the side walls 36 and 38 of the hollow, internal chamber can have narrow bumps 62 projecting outwardly over the diaphragm to retain the diaphragm in the interior space adjacent the bottoms of the labyrinth teeth 48. The end of the diaphragm remote from the discharge end of the emitter contacts the front edge 40 of the internal chamber so that an end of the diaphragm shown in phantom lines at 64 is spaced inwardly from an end wall 66 of the chamber to provide a narrow inlet opening at 50.

A variety of methods can be used for securing the emitter to the exterior side wall of the supply pipe. For example, such plastic welding techniques as heat welding, spin welding, adhesive bonding, high frequency bonding, ultrasonic bonding, electromagnetic bonding, hot air welding and the like can be used. However, best results for the thermoplastic materials used are provided when magnetic induction heat bonding techniques are used. In accordance with these bonding techniques, the rectangular recess 24 which extends around the lower periphery of the emitter is filled with the bonding material 29 which can be of any various materials capable of forming a reliable bond. In the preferred embodiment, the bonding material is a fusible material that is fused to a molten condition in which it creates a bond that welds or otherwise seals the lower peripheral portion of the emitter to the exterior side wall of the supply conduit. In the illustrated embodiment using magnetic induction bonding techniques, the bonding material is a thermoplastic material filled with ferromagnetic particles, and in the presently preferred embodiment, the bonding material is a high density polyethylene filled with iron powder. The narrow rectangular recess 24 is preferably filled with a block of the bonding material which projects away from the bottom of the emitter which forms the rectangular side boundaries for the recess, and the emitter is then welded to a smooth, continuous section of the exterior side wall of the pipe by electromagnetic induction heating techniques. In accordance with such techniques, heat is generated in the bonding material by a variable magnetic field induced by a magnetic coil of a high frequency induction heating generator. The bonding material is an electromagnetic energy absorbing material, both magnetizable and electrically conductive. Heat is rapidly generated when the bonding material is exposed to the magnetic field and this heat is readily transferred to abutting thermoplastic surfaces of the emitter and the supply pipe, rapidly raising their temperatures to just in excess of their melting points, creating a heat bonded joint between the periphery of the emitter and the supply pipe through the molten bonding material. The bond thus formed is a water-tight seal formed around the entire outer boundary of the emitter.

Thus, the interior chamber is closed within the emitter and the interior space within the emitter is formed between the outside wall of the conduit and the walls of the emitter chamber formed internally in the emitter body. A hole (not shown) is formed in the side wall of the supply conduit so that water passing through the hole then passes through the inlet opening 50 of the sealed emitter chamber and into the labyrinthine passage. The position of this hole is not required to be precise as long as it is under the rather large cavity 34. This is not the case for the dripper shown in Mehoudar U.S. Pat. No. 4,210,287 where positioning of the hole from outside the opaque conduit to meet the small exit chamber located inside the conduit is a more difficult procedure.

In using the drip irrigation unit, water under pressure of say 10–15 psi flows in the irrigation supply pipe. A small amount of the water in the supply pipe passes through the hole in the wall of the supply pipe and into the labyrinthine chamber which creates an appreciable pressure drop along the path of the water as it flows from the inlet end 50 toward the discharge end of the labyrinth where the water is discharged through the discharge opening 30 at a slow drip rate. During use, the pressure compensating diaphragm forms one side of the sealed, labyrinthine pressure reducing chamber between the supply pipe and the tops of the labyrinth teeth. The flexibility of the rubber diaphragm provides pressure compensation to uniformly smooth out variations in system pressure. The diaphragm is free to float between the top of the teeth and the outside of the tube when there is no water pressure in the system, but when water pressure is applied, the diaphragm is brought into contact with the tops of the teeth to seal to the tops of teeth to produce the necessary pressure drop. As one advantage, any impurities which may have been caught in the dripper during the previous irrigation cycle are expelled by movement of the rubber diaphragm when water pressure is applied.

The present invention is believed to provide a substantial advance in the art in that the rubber diaphragm not only acts as a pressure compensating device, but also simultaneously acts as the hydraulic seal of the dripper mounted to the outside wall of the tube. Because the rubber diaphragm is enclosed by the dripper body and the outside wall of the supply tube, it cannot be disturbed by the flow of water through the tube, as happens with a dripper inserted inside the supply tube as shown in Mehoudar '287 described previously. Thus, the outside wall of the tube acts as the diaphragm retaining wall and, as a result, the dripper can be made at an extremely low cost with high quality. The dripper is easier to manufacture and quality control with substantially lower capital costs than in the case of a dripper inserted into the interior of the supply tube. The dripper of this invention also can be made with no undercuts and can be molded without sides or core-pin pullers.

What is claimed is:

1. A pressure compensating drip irrigation emitter for connection to the exterior of a supply conduit, the pressure compensating emitter comprising:

an upright peripheral outer wall having a peripheral boundary at one end extending around and leading to an open region within the emitter;

an inside surface exposed to said open region and spaced from the peripheral boundary of the emitter;

a labyrinthine channel formed in the inside surface of the emitter comprising spaced apart teeth projecting from said inside surface into the open region of the emitter;

an elastomeric pressure compensating diaphragm in the open region of the emitter positioned for contact with the ends of the labyrinth teeth spaced from said inside surface; and a bonding material on the peripheral boundary of the upright peripheral outer wall of the emitter for use in bonding the emitter to the exterior wall of a supply conduit, to form a sealed chamber inside the emitter in which the pressure compensating diaphragm is disposed between the exterior wall of the supply conduit and the labyrinth, so that water flowing in the supply conduit can pass through an opening in the conduit and into the sealed chamber and flow to the labyrinth, the water emitted to the sealed chamber under pressure causing the diaphragm to apply pressure to the teeth of the labyrinth to seal one side of the labyrinthine channel within the emitter so that the water emitted to the channel can pass from the channel to the exterior of the emitter at a pressure compensated slow drip rate.

2. Apparatus according to claim 1 in which the bonding material is a fusible material capable of bonding a thermoplastic emitter to a thermoplastic supply conduit and in which the bonding material is capable of being bonded to such a thermoplastic pipe by magnetic induction heating techniques.

3. Apparatus according to claim 1 in which the teeth forming the labyrinthine channel have their remote ends at the same elevation spaced from the inside surface of the emitter wall.

4. A drip irrigation system in which at least one drip emitter unit is bonded to the exterior of a continuous tubular water supply conduit without severing the conduit to attach the emitter units to the supply conduit, the system comprising:

an elongated supply conduit for conducting the flow of water under pressure, the supply conduit having a tubular outer wall of generally uniform cross sectional configuration continuous with the length of the conduit;

an emitter bonded to an exterior surface area portion of said continuous length of conduit, the emitter comprising an upright peripheral outer wall having a peripheral boundary at one end extending around and leading to an open region within the emitter; means forming a fused bond between the peripheral boundary of the emitter outer wall and the supply conduit to form a sealed chamber inside the emitter, in which a circumferential surface area portion of the continuous length of conduit forms a base of the sealed emitter chamber; and a labyrinthine channel formed in the inside surface of the emitter from spaced apart teeth projecting from the inside surface into the open region of the emitter; and an elastomeric pressure compensating diaphragm in the open region of the sealed emitter chamber and positioned for contact with the ends of the labyrinth teeth spaced from the inside surface of the emitter, the pressure compensating diaphragm being disposed within the sealed emitter chamber between the exterior of the continuous supply conduit and the labyrinthine channel so that water flowing in the supply conduit flows through a perforated wall of the supply conduit and into the sealed chamber to thereby flow to the labyrinth, the water admitted to the sealed emitter chamber under pressure causing the diaphragm to apply pressure to the teeth of the labyrinth to seal one side of a labyrinthine channel within the emitter so that water admitted to the labyrinthine channel can pass through the channel to the exterior of the emitter at a pressure compensated slow drip rate.

5. Apparatus according to claim 4 in which the supply pipe and the emitter are made from thermoplastic materials and the emitter is bonded to the supply conduit by a fusible bonding material capable of being bonded to the supply conduit by magnetic induction heating techniques.

6. Apparatus according to claim 4 in which the diaphragm is free to float between the ends of the teeth and the exterior wall of the supply conduit when there is no water pressure in the conduit and, when water pressure is applied to the conduit, the diaphragm is brought into contact with the top of the teeth to form a sealed labyrinthine channel.

7. A drip irrigation system in which at least one drip emitter unit is bonded to the exterior of a continuous tubular water supply conduit without severing the conduit to attach the emitter units to the supply conduit, the system comprising:

an elongated supply conduit for conducting the flow of water under pressure, the supply conduit having a tubular outer wall of general uniform cross sectional configuration continuous with the length of the conduit;

a drip emitter having an upright peripheral wall bonded to an exterior surface area portion of said continuous length of supply conduit, the emitter having an open interior space facing toward said peripheral wall and having a fused bond between the peripheral wall of the emitter and the supply conduit for forming a sealed interior chamber inside the emitter, in which a circumferential surface area portion of the continuous length of conduit forms a base of the sealed emitter chamber;

a labyrinth formed in an inside surface of the emitter spaced from the exterior wall of the conduit, the labyrinth being formed by spaced apart teeth having their ends spaced from the inside surface of the emitter; and an elastomeric pressure compensating diaphragm within the open interior space of the sealed emitter chamber for pressure contact with the ends of the labyrinth teeth so that water admitted under pressure from the supply conduit through a perforated wall of the supply conduit to the sealed chamber seals the diaphragm to the ends of the teeth to form a sealed labyrinthine channel between the diaphragm and the inside surface of the emitter and so that water admitted to the sealed channel flows through the channel and is emitted from the channel to the exterior of the emitter at a slow drip rate controlled by the pressure compensating action of the diaphragm that accommodates changes in line pressure within the supply conduit.

8. Apparatus according to claim 7 in which the diaphragm is free to float between the ends of the teeth and the outer wall of the supply conduit when there is no water pressure in the conduit and, when water pressure is applied to the conduit, the diaphragm is brought into contact with the top of the teeth to form the sealed labyrinthine channel.

9. Apparatus according to claim 7 in which the emitter and the supply conduit are made from thermoplastic materials and in which the emitter is bonded to the conduit by a bonding material capable of forming a fusible bond by magnetic induction heating techniques.

10. A method for manufacturing a pressure compensating drip irrigation system comprising:

providing an elongated supply conduit for transmitting water under pressure;

bonding a drip emitter unit to the exterior wall of the supply conduit to form a sealed interior chamber between the supply conduit and the inside of the emitter unit, the emitter comprising an upright wall having an inside surface facing an interior of the emitter and in which the upright wall has a peripheral boundary for engagement with the supply conduit, the emitter further including a labyrinth formed in the inside surface of the emitter, the labyrinth being formed by spaced apart teeth having their ends spaced from the inside surface of the emitter;

placing an elastomeric diaphragm in the inside region of the emitter, adjacent the ends of the labyrinth teeth; and bonding the peripheral boundary of the emitter to the exterior wall of the supply conduit to form a sealed chamber within the emitter on the exterior side of the supply conduit in which the diaphragm is positioned inside the emitter in a space between the exterior wall of the conduit and the labyrinth, the elastomeric pressure compensating diaphragm being arranged for pressure contact with the ends of the labyrinth teeth so that water admitted under pressure from the supply conduit to the sealed chamber seals the diaphragm to the teeth of the labyrinth to form a sealed labyrinthine channel between the diaphragm and the inside surface of the emitter, and so that water admitted to the sealed channel flows through the channel and is emitted from the channel at a slow drip rate controlled by pressure compensating action of the elastomeric diaphragm that accommodates changes in line pressure within the supply conduit.

11. The method according to claim 10 including:

the steps of placing the inside surface of the emitter adjacent the exterior wall of the supply conduit, providing a region of a fusible bonding material around the peripheral boundary of the emitter and in contact with the exterior wall of the supply pipe, the bonding material being capable of forming a bond between the supply conduit and the emitter by magnetic induction heating techniques; and fusing the bonding material by heat induced by a magnetic induction heating generator to bond the emitter to the exterior wall of the supply pipe to form a closed, internal fluid pressure reducing chamber between the emitter and the exterior wall of the supply pipe.

12. The method according to claim 10 in which the bonding material is a ferromagnetic, electrically conductive material.

13. The method according to claim 10 in which the emitter peripheral boundary includes a recess extending around the periphery of the emitter and the bonding material is positioned between the supply conduit and the emitter within the recess in the peripheral wall of the emitter, and including subjecting the bonding material to the magnetic induction heating to fuse by heat the bonding material while the recess confines the fused bonding material so that the fused bonding material forms a seal between portions of the emitter and the supply conduit extending around the outside of the chamber boundary to seal the chamber boundary.

14. Apparatus according to claim 4, in which the emitter is a one piece unit made from a thermoplastic material and the supply conduit is made of a flexible thermoplastic material of substantially circular cross section free of surface irregularities along said continuous length of conduit.

15. Apparatus according to claim 4, in which a plurality of said emitters are bonded to the supply conduit at spaced apart intervals along said continuous length of conduit.

16. Apparatus according to claim 4, in which the water enters the emitter through said perforated supply conduit wall free from any intrusion of the emitter into the interior of the supply conduit.

17. Apparatus according to claim 7, in which the emitter is a one piece unit made from a thermoplastic material and the supply conduit is made of a flexible thermoplastic material of substantially circular cross section free of surface irregularities along said continuous length of conduit.

18. Apparatus according to claim 7, in which a plurality of said emitters are bonded to the supply conduit at spaced apart intervals along said continuous lengths of conduit.

19. Apparatus according to claim 7, in which the water enters the emitter through said perforated supply conduit wall free from any intrusion of the emitter into the interior of the supply conduit.

20. A drip irrigation system comprising:

a supply conduit for conducting the flow of water under pressure;

an emitter bonded to an outer wall of the supply conduit, the emitter comprising an upright peripheral outer wall having a peripheral boundary of one end extending around and leading to an open region within the emitter, an inside surface exposed to said open region and spaced from the peripheral boundary of the emitter, the peripheral boundary of the upright peripheral wall being bonded to the supply conduit to form a sealed chamber inside the emitter in which the supply pipe and the emitter are made from thermoplastic materials and the emitter is bonded to the supply pipe by a bonding material for forming a bond to the supply conduit by magnetic induction heating techniques;

a labyrinthine channel formed in the inside surface of the emitter from spaced apart teeth projecting from the inside surface into the open region of the emitter; and an elastomeric pressure compensating diaphragm in the open region of the emitter positioned for contact with the ends of the labyrinth teeth spaced from the inside surface of the emitter, the pressure compensating diaphragm being disposed within the sealed emitter chamber between the exterior wall of the supply conduit and the labyrinthine channel so that water flowing in the conduit and into the sealed chamber can flow to the labyrinth, the water admitted to the sealed chamber under pressure causing the diaphragm to apply pressure to the teeth of the labyrinth to seal one side of the labyrinthine channel within the emitter so that water admitted to the labyrinthine channel can pass through the channel to the exterior of the emitter at a pressure compensated slow drip rate.

21. A drip irrigation system comprising:

a supply conduit:

a drip emitter having an upright wall secured to the exterior wall of the supply conduit for forming a sealed interior chamber between the supply conduit and the inside of the upright wall, in which the emitter and the supply conduit are made from thermoplastic materials and in which the emitter is bonded to the conduit by a bonding material for forming a fusible bond by magnetic induction heating techniques;

a labyrinth formed in an inside surface of the emitter spaced from the exterior wall of the conduit, the labyrinth being formed by spaced apart teeth having their ends spaced from the inside surface of the emitter;

an elastomeric pressure compensating diaphragm within the sealed chamber for pressure contact with the ends of the labyrinth teeth, so that water admitted under pressure from the supply conduit to the sealed chamber seals the diaphragm to the ends of the teeth of the labyrinth to form a sealed labyrinthine channel between the diaphragm and the inside surface of the emitter and so that water admitted to the sealed channel flows through the channel and is emitted from the channel to the exterior of the emitter at a slow drip rate controlled by the pressure compensating action of the diaphragm that accommodates changes in line pressure within the supply conduit.

* * * * *